Patented July 18, 1933

1,919,135

UNITED STATES PATENT OFFICE

JOHN G. SCHMIDT, OF PHILADELPHIA, PENNSYLVANIA, ASSIGNOR TO E. F. HOUGHTON AND COMPANY, OF PHILADELPHIA, PENNSYLVANIA, A CORPORATION OF PENNSYLVANIA

REACTION PRODUCTS OF ARYL THIOUREAS AND ALDEHYDES AND METHOD OF PREPARING SAME

No Drawing.   Application filed March 21, 1928. Serial No. 263,593.

My invention relates to new organic chemical compounds having desirable characteristics and to a method of making the same, more particularly it relates to compounds known as the reaction products of an aryl thiourea and an aldehyde.

One object of my invention is to provide a new series of organic derivatives which will be of use in the various arts and industries. A further object is to furnish a relatively simple process resulting in high yields and relatively pure reaction products by which such organic derivatives may be prepared commercially.

The term "aryl" as used throughout the specification and claims has its generally accepted meaning and includes those compounds having at least one aromatic ring. The compounds designated as "aryl thioureas" may be represented by the formula:—

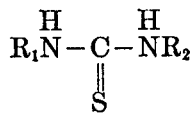

where $R_1$ or $R_2$ or both are aromatic rings. For example, ditolyl thiourea may be taken as typical. The aldehydes which are to be reacted with the aryl thiourea may be either aliphatic, such as formaldehyde, acetaldehyde, propylaldehyde, allylaldehyde, and the like, or aromatic, such as benzaldehyde, cinnamic aldehyde, and the like.

As a typical example, I will describe the reaction between diortho-tolyl thiourea and formaldehyde. In a typical case, I place in a 2 liter flask under a water reflux condenser 256 grams (1 mol) of diortho-tolyl thiourea, 150 grams of 40% formaldehyde solution (2 mols of HCHO), and 200 cubic centimeters of water. The mixture is boiled and refluxed, and after a few hours, the crystals of the diortho-tolyl thiourea begin to disappear with the accompanying formation of a heavy oily compound which sinks to the bottom of the flask. After 16–18 hours refluxing, the crystals of the diortho-tolyl thiourea have entirely disappeared and the reaction is complete. The oily compound is separated from the supernatant water and is ready for immediate use or it may be subjected to distillation under reduced pressure prior to its use. The new compound as produced is a colorless, heavy liquid, very viscous at ordinary temperatures, very slightly soluble in cold water and only sparingly soluble in boiling water. It is readily soluble in ether, benzol, chloroform, acetone, carbon tetrachloride and boiling alcohol. Qualitative tests show an absence of an aldehyde and of thiourea in the resulting product. The product is stable and boils without decomposition under reduced pressure and may be distilled. Up to the present time, all attempts to crystallize the product have failed. Continued heating of the product causes it to change into a resinous solid fusing at about 120° F.

As hereinbefore pointed out, the resulting product does not respond to tests for aldehyde or thiourea groups, and the exact formula of the reaction product is not definitely known.

Instead of carrying the above described reaction out in the presence of water, organic solvents may be substituted or the reaction may be carried out without the use of any solvent. The proportions of the ingredients used in carrying out the reaction may also vary widely. Obviously in place of formaldehyde solution, gaseous formaldehyde or paraformaldehyde may be substituted.

The general procedure may be carried out to form the other reaction products contemplated by the present invention. For example, if thiocarbanilide is used in the reaction in place of the diortho-tolyl thiourea, a solid stable reaction product of a whitish cast with a melting point of approximately 193° C. is obtained. This reaction product is very slightly soluble in water and soluble in alcohol, ether, benzol, chloroform, acetone, and carbon tetrachloride.

As an example of a compound resulting from the reaction of an aryl thiourea and an aromatic aldehyde, I have reacted benzaldehyde with diortho-tolyl thiourea in a process similar to that previously described. The reaction product is stable and of a whitish cast, having a melting point between 160° C.–177°

C. and is very slightly soluble in water, but soluble in ether, alcohol, benzol, chloroform, acetone, and carbon tetrachloride.

From the above description, it will appear that the invention contemplates the formation of reaction products of aryl thioureas and aldehydes. In each case, the percentage of reacting compounds used may be chosen according to the reacting weights of the individual reactants, but often it is desirable to have present an excess of the aldehyde in order to cause the reaction to be more complete.

Considerable modification is possible in the compounds chosen to react as well as in the percentages employed without departing from the essential features of my invention.

I claim:

1. The process of preparing a reaction product between aryl thioureas and aldehydes which comprises reacting 1 mol of an aryl thiourea and an aldehyde in the neighborhood of 2 mols with each other in substantially neutral surroundings in the presence of heat until a chemical reaction between said compounds has taken place, and thereafter separating the reaction product.

2. The process of preparing a reaction product between diorthotolyl thiourea and formaldehyde which comprises reacting 1 mol of diorthotolyl thiourea and formaldehyde in the neighborhood of 2 mols with each other in the presence of heat until a chemical reaction between said compounds has taken place, and thereafter separating the reaction product.

3. The process of preparing a reaction product between aryl thioureas and aldehydes which comprises reacting 1 mol of aryl thiourea and formaldehyde in the neighborhood of 2 mols in the presence of heat and water which is substantially neutral until a chemical reaction has taken place between the compounds, and thereafter separating the reaction product.

4. The process of preparing a reaction product between diorthotolyl thiourea and formaldehyde which comprises reacting 1 mol of diorthotolyl thiourea and formaldehyde in the neighborhood of 2 mols in the presence of heat and water until a chemical reaction has taken place between the compounds, and thereafter separating the reaction product.

5. The process of preparing a reaction product between diorthotolyl thiourea and formaldehyde which comprises reacting 1 mol of diorthotolyl thiourea in the neighborhood of 2 mols in the presence of heat and water until the diorthotolyl thiourea crystals have disappeared with the accompanying formation of the reaction product, and thereafter separating the reaction product from the supernatant water.

6. The process of preparing a reaction product between diorthotolyl thiourea and formaldehyde which comprises reacting 1 mol of diorthotolyl thiourea and formaldehyde in the neighborhood of 2 mols with each other in the presence of heat in substantially neutral surroundings until a chemical reaction between said compounds has taken place, and thereafter separating the reaction product.

7. The process of preparing a reaction product between diorthotolyl thiourea and formaldehyde which comprises reacting 1 mol of diorthotolyl thiourea and formaldehyde in the neighborhood of 2 mols in the presence of heat and water which is substantially neutral until a chemical reaction has taken place between the compounds, and thereafter separating the reaction product.

8. The process of preparing a reaction product between diorthotolyl thiourea and formaldehyde which comprises reacting 1 mol of diorthotolyl thiourea and formaldehyde in the neighborhood of 2 mols in the presence of heat and water which is substantially neutral until the diorthotolyl thiourea crystals have disappeared, with the accompanying formation of a reaction product, and thereafter separating the reaction product from the supernatant water.

9. As a new composition of matter, a stable reaction product of 1 mol of an aryl thiourea and an aldehyde in the neighborhood of 2 mols.

10. As a new composition of matter, a stable reaction product of 1 mol of aryl thiourea and an aliphatic aldehyde in the neighborhood of 2 mols.

11. As a new composition of matter, a stable reaction product of 1 mol of diorthotolyl thiourea and formaldehyde in the neighborhood of 2 mols.

12. As a new composition of matter, a stable reaction product of 1 mol of aryl thiourea and an aldehyde in the neighborhood of 2 mols obtained by reacting the aryl thiourea and the aldehyde in said molecular proportions in substantially neutral surroundings.

13. As a new composition of matter, a stable reaction product of 1 mol of aryl thiourea and an aliphatic aldehyde in the neighborhood of 2 mols obtained by reacting the aryl thiourea and the aliphatic aldehyde in said molecular proportions in substantially neutral surroundings.

14. As a new composition of matter, a stable reaction product of 1 mol of diorthotolyl thiourea and formaldehyde in the neighborhood of 2 mols obtained by reacting the diorthotolyl thiourea and formaldehyde in said molecular proportions in substantially neutral surroundings.

JOHN G. SCHMIDT.